Feb. 2, 1971   J. F. BLUMENFELD ET AL   3,560,189
GLASS MAKING FURNACE

Filed Feb. 27, 1968   2 Sheets-Sheet 1

INVENTORS
JOHN F. BLUMENFELD
GEORGE F. HANKS
BY
*McCormick, Paulding & Huber*
ATTORNEYS United States Patent Office 3,560,189
Patented Feb. 2, 1971

3,560,189
GLASS MAKING FURNACE
John F. Blumenfeld, Simsbury, and George F. Hanks, Avon, Conn., assignors to Emhart Corporation, Bloomfield, Conn., a corporation of Connecticut
Filed Feb. 27, 1968, Ser. No. 708,687
Int. Cl. C03b 3/00
U.S. Cl. 65—335                                    3 Claims

ABSTRACT OF THE DISCLOSURE

A square shaped furnace has dual glass batch chargers at one corner, and a throat through which the molten glass can be withdrawn at a diagonally opposite corner. The furnace has roof with a maximum height along a line connecting thhe diagonally opposed corners, and the height decreases toward the other two laterally opposed corners of the square furnace. The molten glass is heated from above by burners, and laterally opposed electrodes mounted in bays in the furnace side walls extend into the molten glass for Joule-effect heating.

SUMMARY OF THE INVENTION

This invention relates to glass making furnaces, and deals more particularly with a multi-sided furnace having batch charging means at one corner, and throat means through which molten glass can be withdrawn at a diagonally opposite corner.

A general object of the present invention is to provide a glass making furnace having tank dimensions which are so chosen as to minimize heat losses through the sidewalls, said furnace also having a novel roof construction so designed as to minimize heat losses from the top surface of the molten glass, and said furnace nevertheless providing a maximum traverse distance from the point of batch charging to the point of glass withdrawal.

A more specific object of the present invention is to provide a glass making furnace with the foregoing characteristics, and having a rhombus shape which induces the molten glass to flow toward the laterally opposite corners and thereby mix with glass of slightly lower temperature than the molten glass along the diagonal between said batch charger and throat associated corners. These temperature distribution differences induce thermal currents in the glass, thereby tending to equalize the time-temperature history of all the molten glass in the furnace, a result conducive to the production of high quality glass.

Another object of the present invention is to provide a glass making furnace which can not only be heated economically through Joule-effect heating, but which is also so designed that it is able to produce glass effectively over a wide range of tonnages, that is, the furnace has a flexibility in the rates of glass "pull" which can be accommodated.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

DETAILED DESCRIPTION

Figure 1:
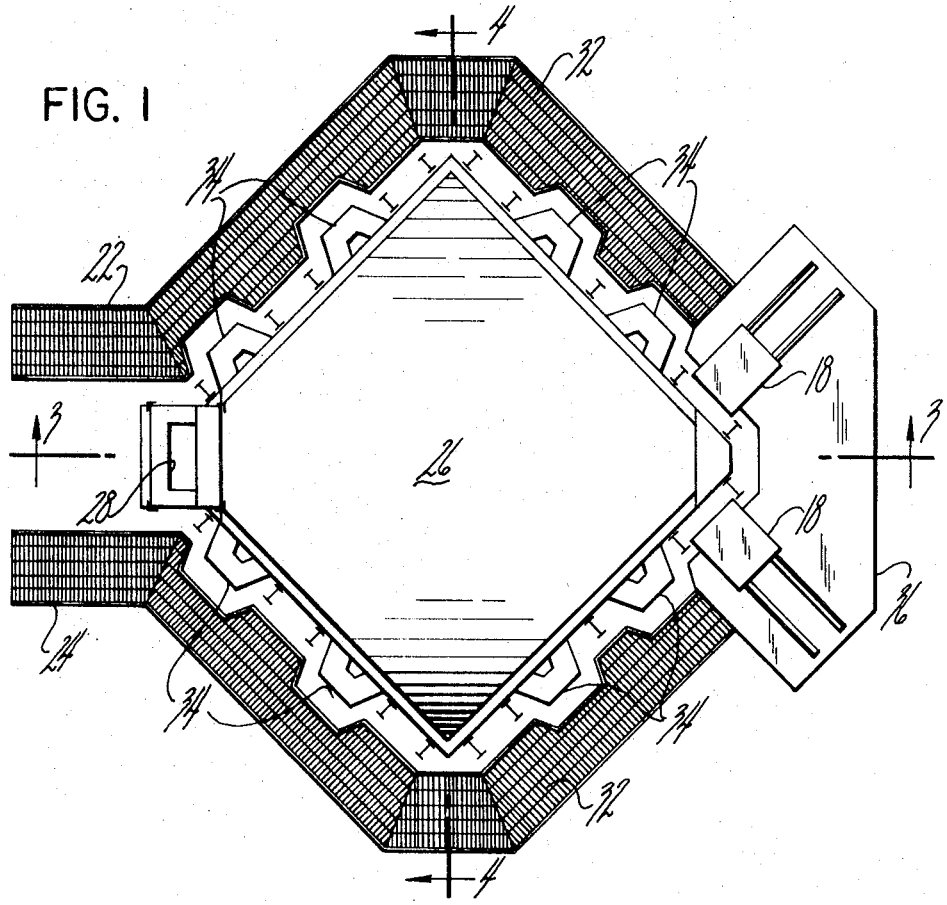
FIG. 1 is a horizontal plan view showing a glass making furnace of rhombus shaped configuration constructed in accordance with the present invention.
Figure 2:
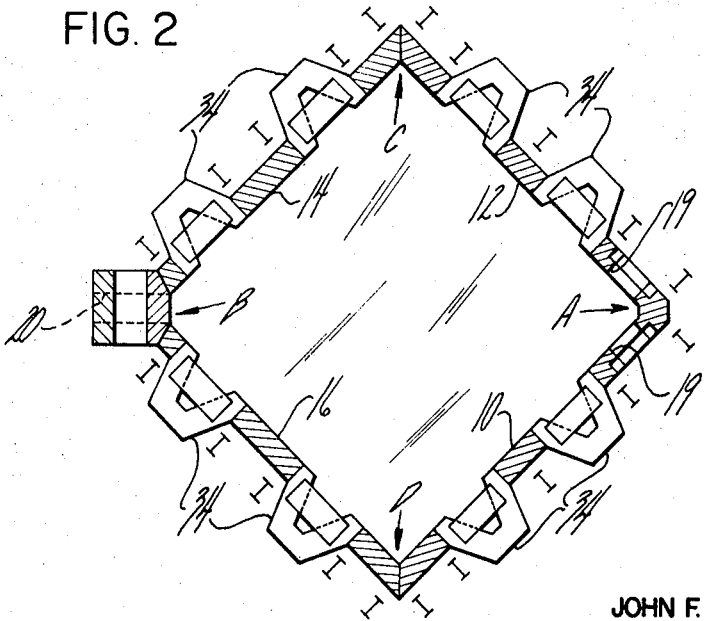
FIG. 2 is a horizontal sectional view of the furnace shown in FIG. 1 taken along the line 2—2 of FIG. 3.

Turning now to the drawings in greater detail, FIGS. 1 and 2 show a square glass furnace having two pairs of opposed side walls 10, 12 and 14, 16 which cooperate to define two horizontally opposed corners, A and B, of the furnace. As shown, the furnace is square but it will be apparent that other shapes may be adopted. For example a rhombus shaped furnace has many of the advantages of the furnace construction shown. Glass batch charging means is provided adjacent one corner A for introducing batch materials to the furnace. As shown, said means comprises dual batch chargers 18, 18 arranged one in either of the corner defining side walls 10 and 12 respectively. These batch chargers may be operated either sequentially, or simultaneously, to provide patterns of glass batch on the molten glass in the furnace in accordance with the disclosure made in Pat. No. 3,127,033 issued to A. K. Lyle, Mar. 31, 1964.

Throat defining means 20 is provided at the diagonally opposite corner B so that the molten glass can be withdrawn from the furnace for use. Typically, a forehearth installation would be provided between the platform legs 22, 24 for feeding the molten glass to a feeder bowl gob forming mechanism.

Figure 3:
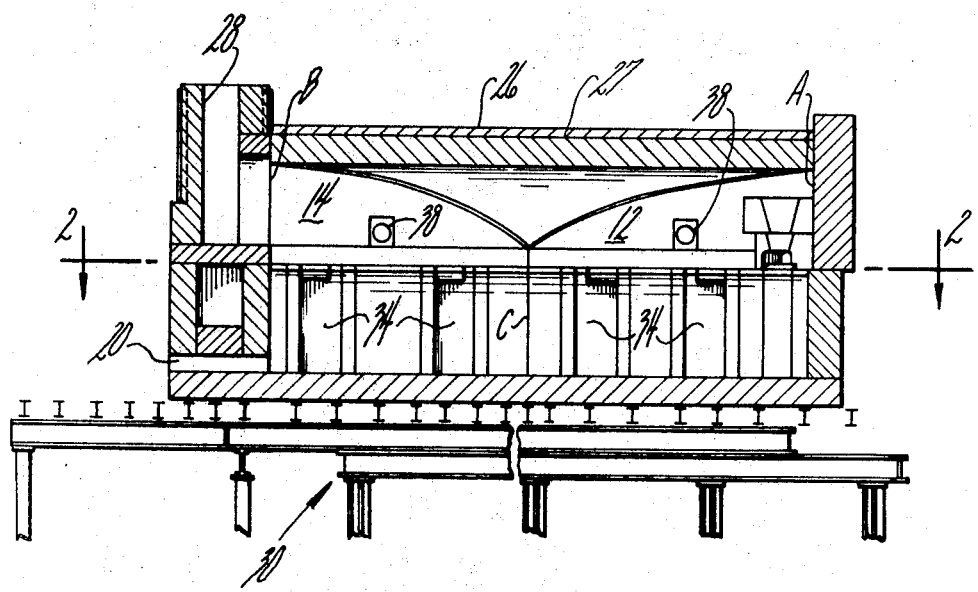
FIG. 3 is a vertical sectional view taken along the line 3—3 of FIG. 1.
Figure 4:
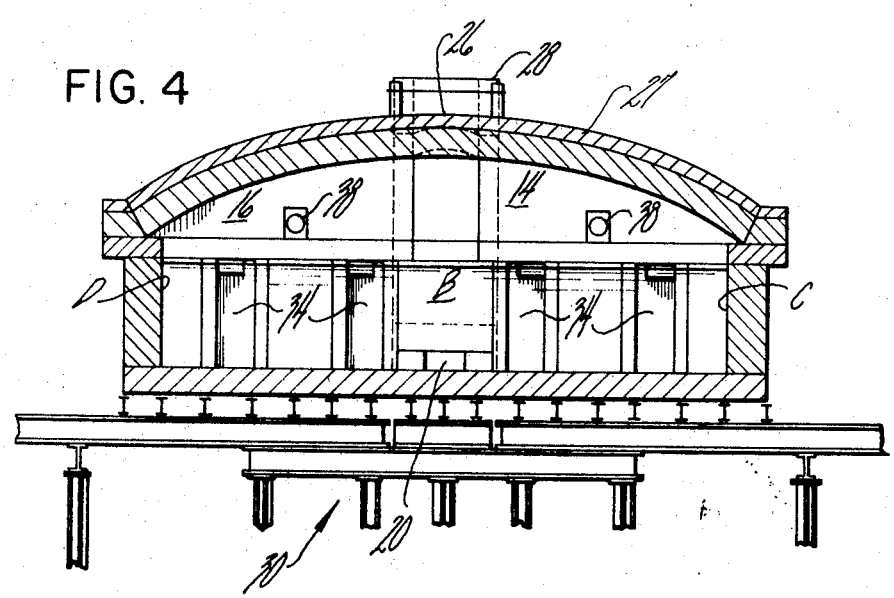
FIG. 4 is a vertical sectional view taken along the line 4—4 of FIG. 1.

The furnace roof, best shown in FIGS. 3 and 4, comprises a structure which has a maximum height or peak 26 along the diagonal of the square between the corners A and B, and a minimum height at the corners C and D resulting in an arch shaped roof as best shown in FIG. 4. The roof is preferably insulated as shown at 27 to improve operation of the furnace without a batch blanket. Still with reference to FIG. 3 a stack structure 28 is provided for removal of products of combustion and volatile gases given off upon melting of the glass batch materials in the furnace. The furnace floor is supported on a structural steel framework 30 as best shown in FIGS. 3 and 4.

The furnace supporting framework 30 also carries a walk way as indicated at 32 to permit workmen to gain access to bays 34, 34 defined in the side walls for receiving the electrodes used in maintaining a particular molten glass temperature in the furnace. A platform 36 adjacent the corner A is provided for permitting access to the glass batch chargers 18, 18. Each of the bays 34, 34 is arranged in its associated side wall generally opposite to an associated bay in the laterally opposed side wall, and has an opening above the surface of the molten glass for receiving a depending electrode (not shown), which electrodes can be removed and replaced with facility in accordance with Pat. No. 3,362,808 entitled "Glass-Melting Furnace" issued to A. K. Lyle on Jan. 9, 1968. Conventional burners 38, 38 are also provided, in the side walls, and more particularly in the breast wall portion thereof, for initially raising the temperature of the glass in the furnace, and these burners may be used during operation of the furnace if desired.

From the foregoing description it will be apparent that the path of the molten glass introduced by the batch chargers 18, 18 adjacent the corner A tends to flow diagonally toward the opposite corner B. The path A–B is 40% greater than it would be if the charging means and throat were located in centered relation along two opposite side walls of the glass making furnace. The furnace shown has a minimum side wall surface area through which the heat of the glass can be lost as it travels along the path from A to B, in a particular size furnace tank.

It is an important feature of the present invention that the height of the roof of the furnace is a maximum along the diagonal path A-B and decreases in both lateral directions towards the corners C and D to provide an arched shaped roof, as viewed in lateral cross section per FIG. 4 for example.

In glass making furnaces generally the quantity of heat required is not only proportional to the "pull" or rate of withdrawal of the molten glass through the throat, but will also be dictated by the length of time taken by the glass in travelling from A to B. The glass must have a time-temperature relationship to assure production of glass of predetermined quality. Thus, the glass flowing from A to B will be heated to a particular average temperature for some predetermined time. The glass in the furnace tank adjacent to the laterally opposed corners C and D will tend to be somewhat cooler than the glass along the diagonal A-B as a result of heat losses in these corner defining portions of the furnace due to their relatively large external surface area. This difference in temperature will induce thermal currents within the glass in a direction transverse to the general flow from the charging zone A to the throat B. However, the glass which wanders toward the laterally opposed corners C and D will displace glass in these corners causing a general mixing action. In this manner convection currents are established throughout the glass causing this general mixing action and thereby maximizing the time-temperature history of all the lass withdrawn from the furnace.

We claim:

1. A furnace structure for making glass comprising a generally horizontal bottom portion of rhombus shape, two opposed pairs of side walls defining first and second pairs of opposed corners therebetween, a pair of glass batch chargers mounted in openings in said side walls, both of said batch charger openings being located adjacent one of the corners in said first pair, means defining a throat at a corner opposite said one corner in said first pair and through which throat the molten glass can be withdrawn, means carried by said furnace side walls for heating the glass, and a roof structure supported on said side walls, said roof structure having a maximum height on a line between said one and said opposite corners, which roof height decreases toward said second pair of corners to provide an arch-shaped structure.

2. A glass making furnce as set forth in claim 1 wherein said heating means comprises burners mounted in said side walls for firing into the furnace above said glass, and electrode mounted in said side walls and extending into the molten glass for heating said glass below the surface thereof.

3. A glass making furnace as set forth in claim 2 wherein said electrodes are mounted in bays defined in said side walls, each side wall having at least one bay disposed in laterally opposed relationship to a bay in the opposite side wall of said furnace.

References Cited

UNITED STATES PATENTS

| | | | |
|---|---|---|---|
| 2,559,683 | 7/1951 | Skinner | 13—6 |
| 2,593,197 | 4/1952 | Rough | 65—335 |
| 3,127,033 | 3/1964 | Lyle | 65—335 |
| 3,217,033 | 11/1965 | Kollonitsch | 260—520 |

S. LEON BASHORE, Primary Examiner

J. H. HARMAN, Assistant Examiner

U.S. Cl. X.R.

13—6; 65—346, 347